UNITED STATES PATENT OFFICE.

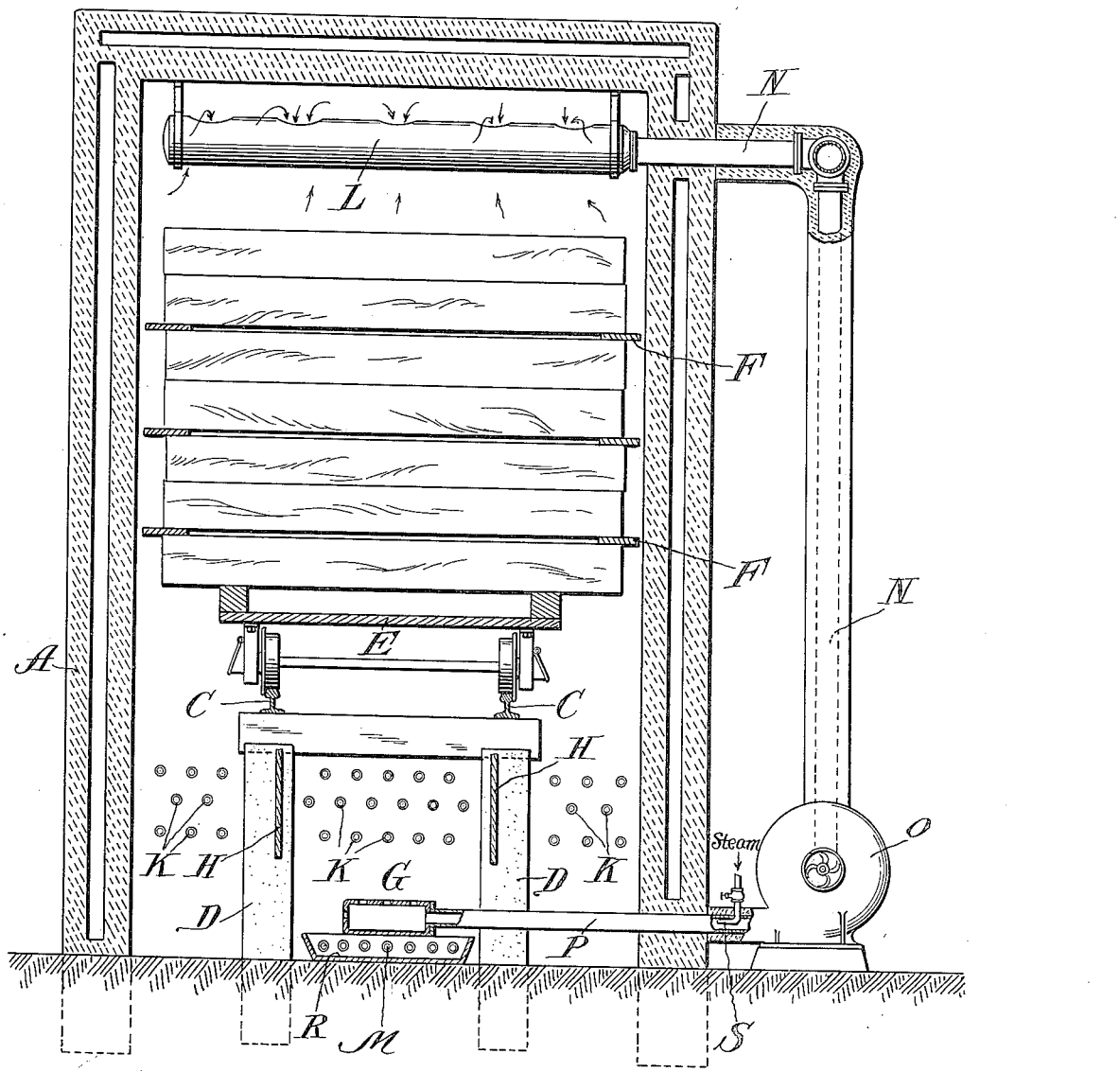

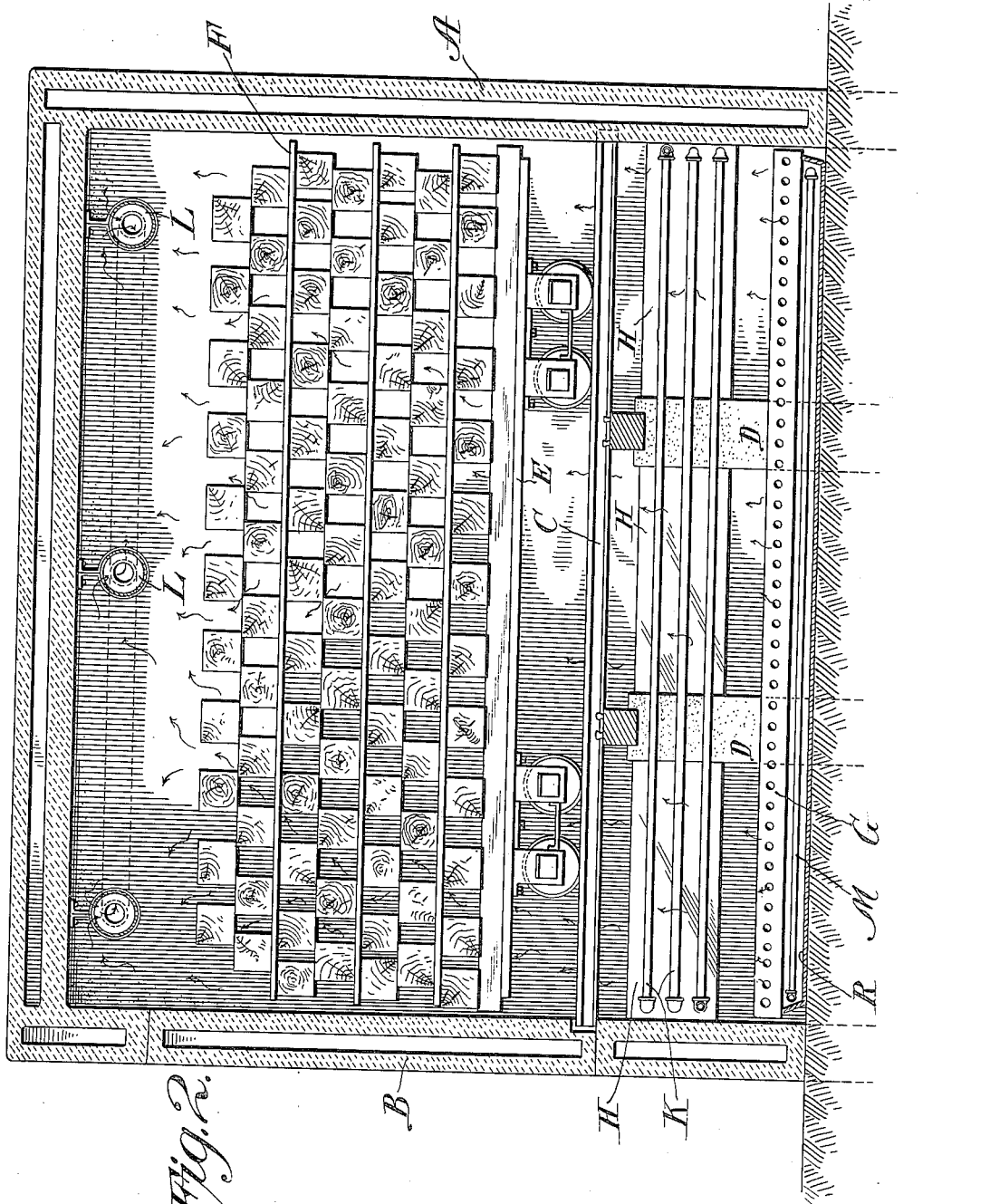

GEORGE WHITMAN McMULLEN AND GEORGE BARRETT McMULLEN, OF PICTON, ONTARIO, CANADA.

PROCESS OF DRYING LUMBER AND PRODUCT THEREOF.

1,125,862. Specification of Letters Patent. Patented Jan. 19, 1915.

Application filed April 6, 1914. Serial No. 829,925.

*To all whom it may concern:*

Be it known that we, GEORGE WHITMAN McMULLEN, a citizen of the United States, and GEORGE BARRETT McMULLEN, a subject of the King of Great Britain, residing at Picton, Province of Ontario, Canada, have invented certain new and useful Improvements in Processes of Drying Lumber and Product Thereof, of which the following is a specification.

This invention relates to a process of preserving wood and has for its object not only completely and thoroughly to dry or season timber, particularly large pieces, such as balks, beams, railroad-ties, telegraph-poles, etc., without impairment of the strength of the wood, but also to further preserve the thoroughly dried timber against subsequent decay.

It is well known that dry wood does not rot, because cellulose is practically insoluble in ordinary reagents, including water, and because the albuminoids, gums, and pectous substances of the wood juices on which fungi and bacteria thrive are rendered practically insoluble by thorough drying. There are, however, other bacteria or fungi which may, in the presence of a suitable propagating medium, such as liquids containing organic and inorganic compounds, have a decomposing action on the cellulose of the wood. This condition may exist when timber such as railroad-ties and telegraph-poles are wholly or partially embedded in the ground.

In order, therefore, completely to protect the timber, we not only subject it to a thorough and complete drying but apply a coating of crude petroleum, creosote oil, or other like material having some waterproofing quality as well as preferably some bactericidal or antiseptic action. This material need only be superficially applied, surface impregnation being all that is necessary, as complete impregnation has a weakening effect.

In prior Patent No. 787,093, dated April 11, 1905, is described a process of drying in which the lumber or other material is heated in a closed chamber, the atmosphere of such chamber being kept highly saturated by the moisture evaporated from the drying material, which is submerged in or surrounded by this atmosphere. The process of this patent has, in practice, been found to be effective with small pieces, such as hickory axles, but the time required to thoroughly dry lumber, particularly large pieces such as railroad-ties, telegraph-poles, beams, etc., is unnecessarily and objectionably long.

We have now discovered a mode of procedure by which the time of drying may be lessened, and a simplified apparatus used, while the lumber is effectively seasoned or dried.

In the present invention, we retain the essential feature of maintaining, during the preliminary stage, around the drying lumber, an atmosphere largely saturated with moisture to protect the drying material from checking or other injury during the treatment. In an atmosphere properly saturated,—and by this is meant that its percentage of saturation shall bear proper relation to the stage of dryness of the load,— any section of timber can be perfectly seasoned without injury in a single chamber and sent out into ordinary atmosphere at once fitted for its proper use. Many timbers, such as cedar, bass-wood, the various pines, poplars, spruces, and balsams, can be treated much more easily than the denser woods, as oaks, ash, maple, beech hickory, and other well-known "hard woods." They all call for substantially the same drying temperatures, say for 120-160° F. In case of the soft woods, the percentage of saturation may be reduced quite easily from about 100 down to even 60. The lowering of the saturation percentage must be made with regard to the safety of the timber based on experience. Special woods, such as osage orange, supposed ordinarily to be incapable of use, have been dried perfectly without a flaw, in an almost completely saturated atmosphere at all times above 90. The oaks and hickories in considerable sections must, however, be held at a relatively higher point of saturation than other woods equally dense. The maintenance of a relatively complete saturation is of importance only during the preliminary stage of the treatment, and thereafter the temperature may be maintained practically constant at the desired maximum while the humidity of the atmosphere in the chamber is gradually decreased, with the result that the moisture is eliminated from the lumber much more rapidly than in the former method and without danger of injury to the material. It has been further found that by maintaining a rapid circulation of the atmosphere of the kiln, the conditions of temperature and humidity within the kiln can be more thoroughly controlled, and the drying accelerated.

Our new process, while applicable to lumber of any size, is particularly adapted for the treatment of large or bulky pieces such as beams, balks, railroad-ties, telegraph-poles, etc., a class of material to which artificial drying-processes have not heretofore been sucessfully applied.

Our process enables us to take large pieces of preferably green timber and to so maintain, during the seasoning, the surface porosity, that they can be completely dried without injurious checking, and at temperatures so low that the natural structure and constituents of the wood are in no way affected, and thus their natural strength remains unimpaired.

Our present invention comprises the use of a closed kiln provided with means for circulating the entire atmosphere of the kiln and also with means for providing within the kiln an entirely saturated atmosphere, whenever and as needed.

The accompanying drawings illustrate an apparatus which may be used to carry out means for drying the wood.

The means for coating the dried timbers are well known to those skilled in the art, and it has not been considered necessary to illustrate them.

In the drawings—Figure 1 is a transverse vertical section through the drying-kiln; and Fig. 2 is a longitudinal vertical section.

A is a box-kiln having walls, preferably provided with insulating air spaces.

B is a door.

C, C are rails, supported on pillars D, D.

E is a car for carrying the articles to be dried, in this case illustrated as railroad-ties.

Below the level of the tracks are steam-pipes K, K, K, constituting the means for heating the kiln.

Below the steam-pipes, is an air-trunk G, extending the length of the kiln and provided with suitable apertures.

Between the pillars are arranged partition boards H, H, H, to prevent undue lateral diffusion of the upflowing air.

The ties are piled on the cars, with intervening spacing-boards F, F, which are arranged to extend in close proximity to the walls of the kiln to prevent leakage of the heating current around the ends of the piled ties.

At the upper portions of the kiln are arranged a series of pipes L, L, with openings in the top. These pipes are connected to a pipe N, covered with any suitable heat insulation, and connected to the inlet of a fan O, whose delivery is through the pipe P to the apertured air-trunk G. There is thus provided a means for producing a circulation of the entire atmosphere of the kiln, and means for heating the atmosphere to the desired extent.

In order to control the humidity of the air within the kiln, I prefer to use an open pan R, within which are heating pipes M, by means of which water contained in the pan may be vaporized, and we prefer to use the vapors thus produced for this purpose. An additional means, such as a steam-jet S, is shown, through which steam may be admitted into the delivery-pipe P.

It is important to provide a uniform distribution of the heated air through the kiln, and means for attaining this result other than those shown, may be used. The details of construction of the kiln, such as piping connections, have not been shown, as these are features well known to those skilled in the art.

Our kiln, as will be seen, consists of a single chamber practically closed against outdoor air, but not hermetically sealed. This chamber is practically evenly heated throughout, except that for the slight natural difference, the upper portion is necessarily a few degrees warmer than the lower. We load a kiln twenty-five feet long, eight feet six inches wide and about eighteen to twenty feet high with about five hundred ties, weighing upon an average one hundred and fifty pounds each and making an aggregate of about seventy-five thousand pounds. If put in green, the water-content of this body of ties will be about thirty thousand pounds, being forty per cent. of their total weight. In order fully to dry such ties in thirty days, it is necessary to extract only about one thousand pounds of water per day. The fan is of such size and is driven at such speed that with the natural drop of temperature in the insulated return conduit N, which may not be more than 5° F., the requisite amount of water is removed from the current of air at the desired rate. In fractice, therefore, even though we draw air out of the top of the kiln and carry it through thoroughly insulated pipes back into the lower portion of the kiln, it is difficult, without additional vapor, to maintain the desired degree of saturation, and it is therefore at times necessary to furnish additional moisture from the water pans, or otherwise. In fact, the return conduit N, may, where conditions permit, preferably be located within the kiln itself. The circulation described automatically reduces the water-content of the air, since in a kiln eighteen feet high, with heating-pipes at the bottom, the temperature at the top is five or six degrees higher than at the bottom.

The mode of operation is as follows:—
The timber, railway-ties for example, is piled upon the car, put within the kiln and the kiln is completely closed. At the outset the steam is turned on to the coils M submerged in the water pans and a rapid production of vapor follows with the result that the atmosphere in the kiln is very quickly saturated. The steam is also turned into the coils K and the temperature of the interior of the kiln is thereby gradually raised to about 130° F. The timber is maintained at this temperature and in this highly saturated and stagnant atmosphere in the tightly closed chamber until it has lost, as determined by test pieces, two or three per cent. of its weight, this preliminary period lasting, according to the size of the pieces and the character of the wood, from 24 to 48 hours. As the humidity is maintained throughout this period above 95 per cent., the green timber, filled as it is with its natural sap, is in no danger of injury during this initial drying-period. It has been found in practice that by subjecting the timber to this very humid atmosphere, the surface of the stick is so affected that the ends of the pores which extend through its entire length, are so kept open that the outflow of moisture is practically uniform, and therefore the percentage of moisture is gradually reduced through the entire body. The pores of the wood are thus relieved from the pressure incident to the expansion of the moisture therein, and thereafter the percentage of saturation may be gradually lowered and the drying temperature gradually increased to the maximum temperature desired, about 150° F. and not more than 160°. We have limited the range of temperatures to from 130 to about 160° F. We do this not because higher temperatures would not be effective in drying, but experience has proven that the best results for permanency of the timber are attained within these temperatures, and that they should not be carried above 160°, as there will then be a tendency to weaken the natural structure of the timber. Elaborate and repeated experiments have shown that the exposure to temperatures above 160° of large sections of timber for the considerable periods of time (for railway-ties, from three to five weeks) required for their complete drying, inevitably results in a disastrous effect on the strength of the timber, and that temperatures of 180° are prohibitively destructive. Thus, it has been found that such soft woods as jack pine, which is in Canada largely used for ties, must not be subjected for long periods to a temperature even as high as 160°. It will be evident, therefore, that the maximum temperatures which can be safely used with these large sections, are determined according to the character of the wood used. It will be manifest that where the section is large, involving prolonged periods of drying, temperatures must be used that may be considered practically unnecessarily low where the section is small and the exposure for a short time. Another feature must be thoroughly considered, that the enormous weight of railway-rolling stock and consequent stress upon the supporting timbers call for the preservation of the ultimate strength of such timber as a primary consideration. Where timber is used for furniture and other purposes that do not involve a heavy strain, less attention may perhaps be paid to its ultimate endurance, but no such factor can be neglected or overlooked with railway-ties. After the first day or two, the saturation percentage is reduced to between 90 and 95 per cent. for the next three or four days, while the temperature of the kiln atmosphere is being gradually raised to the maximum. This higher or maximum temperature is then steadily maintained until the end of the drying with a gradual diminution of the percentage of saturation to the end of the process, which may take from 28 to 30 days for soft wood ties and longer for hard wood ties. As has above been stated, it is preferred, during the preliminary period, to maintain the atmosphere of the closed kiln in a stationary or stagnant condition. During the subsequent drying and to the end of the operation, we maintain the atmosphere of the kiln in a constant state of motion by means of a circulating fan which withdraws the air from the top of the kiln and re-introduces it at the bottom where it is again uniformly distributed over the heating pipes by which it is additionally heated. Practical experience has shown that the slight cooling which results from thus passing the atmosphere through the fan, even when the conduits are carefully insulated, inevitably causes the precipitation of a quantity of moisture corresponding to this lowering of temperature and that the air upon re-heating is again ready to absorb further quantities of moisture as it is given off from the drying wood. During this period,—i. e., after the first two days of immersion in a saturated atmosphere, to the end of the drying operation,—the temperature is carefully maintained at substantially the maximum temperature, while the humidity is gradually reduced until the percentage of humidity is between 60 and 70 per cent. This gradual diminution in humidity increases the absorptive capacity of the atmosphere brought into contact with the wood, and this contact is intimate and repeated because of the constant flow produced by the circulating fan. By means of a properly proportioned fan, it has, in practice, been found possible to circulate the entire atmosphere of the kiln in less than two minutes, and it will be evident that this flow of air of gradually reduced humidity will greatly accelerate the absorption of the vapors produced from the wood and their gradual removal by condensation.

The result of the foregoing treatment is to produce a thoroughly and uniformly dried stick or block of timber which will, under the ordinary conditions of use of telegraph poles, railway-ties, etc., have its life extended far beyond the period of useful existence of similar articles when permitted to dry under natural conditions. The ordinary method of seasoning large pieces of timber, such as railway-ties, etc., is to permit them to season in the open air, usually exposed to the existing atmospheric conditions, for a period of six months, and, in rare cases, as long as a year. Neither of these periods will perfectly season the article. In order to completely season such articles, even longer exposure is absolutely essential; and in any case the articles, during these long periods of exposure would be subjected to all the natural destructive rotting, and, what is termed, dry rotting as well. In contrast with these naturally dried articles, the product of our process is manifestly superior, because, in the process of seasoning, the block has not been subjected to any exposure to any external deteriorating agencies but has had the sap quickly removed and yet without any disturbance or interference with the natural structure of the wood. We therefore produce as a new article of manufacture, a completely and thoroughly seasoned or dried railway-tie or other article. In other words, the maximum period in our process of removal of the sap, which is the material on which the destructive germs or fungi live, extends over a period of only a few weeks and, during this period, the temperature conditions are such as to destroy or prevent the growth of these deteriorating agencies. Where the ties are exposed for six months or a year, obviously every opportunity is afforded for all these destructive agencies to come into play.

Experience with hickory axles has shown that the loss from germ- and fungus-attacks during complete air-seasoning amounted to about fifteen per cent.; while with the process described in Patent No. 787,093, many thousands of axles have been treated with no loss whatever.

The complete seasoning and drying effected by our process is ordinarily sufficient to almost indefinitely extend the useful life of the materials treated, unless they are buried wholly or partially under ground, under such conditions that they are especially liable to outside attack.

It is well known that the removal of water from timber brings about a condition which, during its continuance, does not allow growth of wood-destroying fungi,—in other words, dry wood will not rot, and seasoned timber lasts much longer than unseasoned, because the decay of wood is due to the attacks of wood-destroying fungi which cannot grow in the absence of water. It is further well known that cellulose is practically insoluble in ordinary reagents, including water, and that the cellulose is only attacked by natural bacteria in the presence of a medium containing soluble organic and inorganic bodies on which the bacteria or fungi can grow. Therefore, in order additionally to protect the thoroughly dried and seasoned wood produced by our process, especially where it is to be embedded in the ground as in the case of railroad ties and the butt ends of poles, we may apply a coating of some protective, preferably germicidal, or antiseptic material, such as crude petroleum, creosote oils, tar, etc., which will prevent. because of their waterproofing characteristics, the admission to the pores of the wood of outside liquids. We consider, therefore, that we have produced as a new article of manufacture a thoroughly dried railway-tie or similar article, coated or superficially impregnated with a water-protective coating, which may also have antiseptic or bacteria- or fungi-inhibitive properties, thus greatly prolonging the life of the dried and treated tie, even when embedded in the earth under conditions which would shorten the life of a thoroughly dried tie. This coating of the ties or other articles may be effected by any of the usual methods, such as dipping or immersion in a bath of heated crude oil, tars, or other material; or by a short subjection of the articles immersed in the coating liquid in a closed tank while under a reduced pressure.

For convenience, the term "railway-ties" has been used in the claims to indicate large sections or blocks of timber, but it is to be understood that this term includes poles, beams, and other bulky articles, such as have been referred to in this specification.

It will further be understood that by thorough and complete drying is meant that the percentage of moisture in the cross-tie, pole or other article has been reduced to a point that would prevent any injurious effect from bacteria or other destructive agents because of remaining percentage of moisture. This will make quite clear the prime importance of protecting exposed surfaces of a tie or timber, especially when lying on the ground, against admission of liquids.

As the interior of the cross-tie is free from any destructive agents, an exterior waterproofing coat, particularly if it be germicidal or antiseptic in character, indefinitely prolongs the life of the tie. Under the term "germicidal", we intend to include not only materials which are actually destructive to germs, but also those which are antiseptic or inhibitive in character.

We claim:—

1. The process of preserving wood, which consists in thoroughly and completely drying the same and then applying a water-protective and germicidal material.

2. The process of preserving wood, which consists in thoroughly and completely drying the same and then applying a water-protective material.

3. The process of treating bulky pieces of timber such as railway-ties, which consists in gradually heating such pieces in a closed kiln in a substantially saturated atmosphere to a temperature not higher than 160° F., continuing the heating at such temperature and in an atmosphere of gradually decreasing humidity until the ties are thoroughly dried.

4. The process of treating bulky pieces of timber such as railway-ties, which consists in gradually heating such pieces in a closed kiln in a substantially saturated atmosphere to a temperature not higher than 160° F., continuing the heating at such temperature and in an atmosphere of gradually decreasing humidity until the ties are thoroughly dried, and continuously circulating the atmosphere of the kiln during such continued heating.

5. A railway tie or the like, artificially dried, having its strength unimpaired, the moisture-content thereof having been reduced to a degree sufficient to prevent injurious action of fungi and bacteria.

6. A railway tie or the like, artificially dried, having its strength unimpaired, the moisture-content thereof having been reduced to a degree sufficient to prevent injurious action of fungi and bacteria and coated with a germicidal and water-protective material.

7. A railway tie or the like, artificially dried, having its strength unimpaired, the moisture-content thereof having been reduced to a degree sufficient to prevent injurious action of fungi and bacteria and coated with a water-protective material.

In testimony whereof, we affix our signatures in presence of two witnesses.

GEORGE WHITMAN McMULLEN.
GEORGE BARRETT McMULLEN.

Witnesses:
 MARY C. NAIRN,
 ALICE M. WARBURTON.